United States Patent [19]

Sandhage

[11] Patent Number: 5,259,885
[45] Date of Patent: Nov. 9, 1993

[54] PROCESS FOR MAKING CERAMIC/METAL AND CERAMIC/CERAMIC LAMINATES BY OXIDATION OF A METAL PRECURSOR

[75] Inventor: Kenneth H. Sandhage, Randolph, Mass.

[73] Assignee: American Superconductor Corporation, Westborough, Mass.

[21] Appl. No.: 679,614

[22] Filed: Apr. 3, 1991

[51] Int. Cl.$^5$ ............................................... C23C 8/06
[52] U.S. Cl. ........................................ 148/282; 505/1; 505/736; 505/742; 505/785; 264/82; 148/316; 148/431; 148/DIG. 35
[58] Field of Search ................... 505/786, 742, 1, 785; 427/62; 264/82; 148/316, 282, 431, DIG. 35; 428/930, 688, 621, 629, 632, 633, 669, 671, 673, 469, 472.1, 539.5, 627, 628; 419/10, 19, 20, 21, 22, 87

[56] References Cited

U.S. PATENT DOCUMENTS

| | | | |
|---|---|---|---|
| 3,061,482 | 10/1962 | Grant | 148/282 |
| 4,649,083 | 3/1987 | Fister et al. | 428/629 |
| 4,968,663 | 11/1990 | Whang | 505/736 |
| 5,100,870 | 3/1992 | Chen et al. | 505/736 |

FOREIGN PATENT DOCUMENTS 57-56168  11/1982  Japan .................... 148/282

*Primary Examiner*—Mark L. Bell
*Assistant Examiner*—C. M. Bonner
*Attorney, Agent, or Firm*—Hale and Dorr

[57] ABSTRACT

A method of preparing a laminated ceramic. The method includes preparing a precursor having at least one noble metal element component and at least two non-noble metal elements. The precursor is exposed to a first environment to form an oxidized zone having a first concentration of a primary ceramic phase containing the non-noble metal elements. The precursor is next exposed to a second environment to form a second oxidized zone having a second concentration of the primary ceramic phase, the second concentration being less than the first concentration. The precursor is repeatedly exposed to each environment to form a plurality of zones with the first concentration of the primary ceramic phase separated by zones with the second concentration of the ceramic.

26 Claims, 5 Drawing Sheets

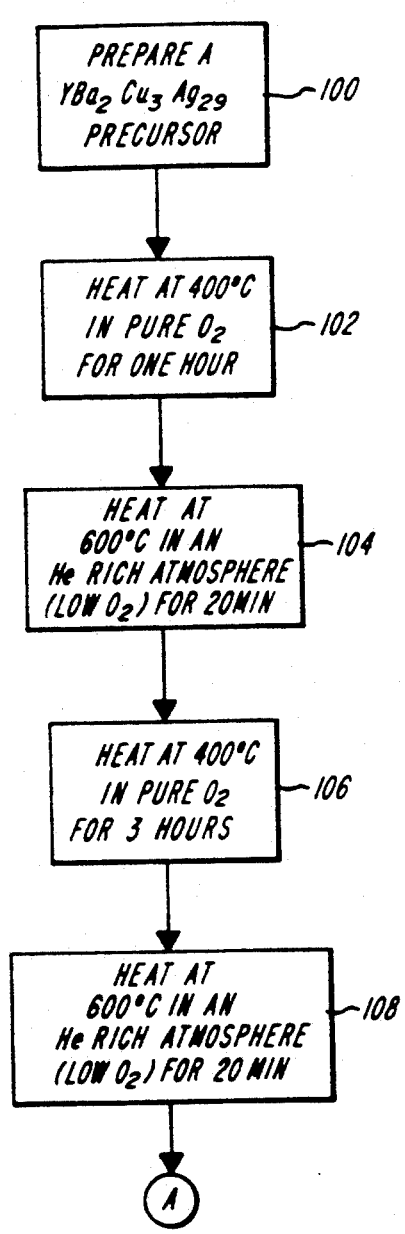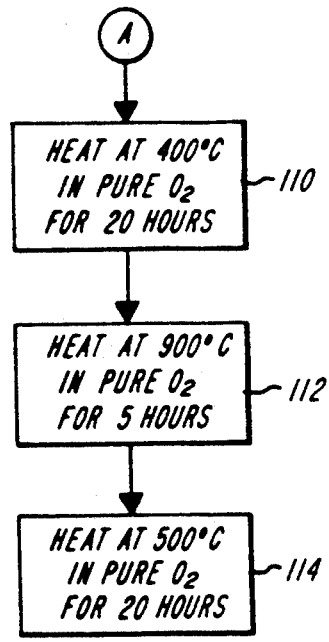
FIG. 4A
FIG. 4B

PROCESS FOR MAKING CERAMIC/METAL AND CERAMIC/CERAMIC LAMINATES BY OXIDATION OF A METAL PRECURSOR

FIELD OF THE INVENTION

This invention relates generally to laminated ceramic-bearing materials, and to a process for making such materials.

BACKGROUND OF THE INVENTION

A laminated body has layers of a primary ceramic phase separated by layers of either metal or a secondary ceramic phase. The primary ceramic phase possesses desired properties such as electrical, optical, magnetic, thermal, and/or mechanical properties. For example, the primary ceramic layers may possess superconducting properties thereby yielding a laminated superconductor. As another example, the primary ceramic phase may possess dielectric properties thereby causing the laminate to operate as a multilayer capacitor.

A "ceramic" is defined herein as a compound in which a metal species has been placed in a higher valence state. A metal oxide is a common example of such ceramics. Oxidation is the process by which metal elements are converted to a higher valence state. While metal oxides can contain oxygen, it should be noted that "oxidation" and "oxidized" metals or zones, as those terms are used herein, do not necessarily include oxygen. Examples of oxidized metals include sulfides, halides, carbides, nitrides, carbonates and metal-oxygen compounds. Metals or alloys can be oxidized by heating them in an oxidizing atmosphere (e.g., in atmospheres containing $O_2$, $S_2$, $N_2$, or $CO_2$). They can also be oxidized by applying an electric potential.

Composites of ceramic and metal of various morphologies are less susceptible to catastrophic brittle fracture than pure ceramics. Several theories have been proposed to explain the improved mechanical properties of a ceramic and metal composite (e.g., crack bridging, crack deflection, crack blunting, and crack shielding). F. Erdogan, P. F. Joseph, "Toughening of Ceramics through Crack Bridging by Ductile Particles," *J. Am. Ceram. Soc.*, Vol 72, No. 2, pp. 262-70, 1989. A. G. Evans, R. M. McMeeking, "On the Toughening of Ceramics by Strong Reinforcements," *Acta Metall.*, Vol. 34, No. 12, pp. 2435-2442, 1986. L. S. Sigl, P. A. Mataga, B. J. Dalgleish, R. M. McMeeking, and A. G. Evans, "On the Toughness of Brittle Materials Reinforced with a Ductile Phase," *Acta Metall.*, Vol. 36, No. 12, pp. 945-953, 1988. According to these theories, the microstructure or morphology of the ceramic-and-metal composite determine the composite's tendency to crack. For example, toughening by a crack-bridging mechanism is enhanced for a metal/ceramic composite consisting of large, interconnected metal particles uniformly distributed about the ceramic phase.

Composites composed of two different ceramics can also be less susceptible to catastrophic brittle fracture than single ceramic bodies. Mechanisms for enhanced fracture toughness of ceramic/ceramic composites include transformation toughening, crack-deflection toughening, microcrack toughening, crack-bridge toughening, crack-branch toughening, and fiber-pullout toughening. R. W. Rice, "Ceramic Matric Composite Toughening Mechanisms An Update," *Ceram. Eng. Sci. Proc.*, Vol. 6, pp. 589-607, 1985. R. W. Rice, J. R. Spann, D. Lewis, W. Coblenz, "The Effect of Ceramic Fiber Coatings on the Room Temperature Mechanical Behavior of Ceramic-Fiber Composites," *Ceram. Eng. Sci. Proc.*, Vol. 5, pp. 614-624, (1984); D. B. Marshall, A. B. Evans, "Failure Mechanisms in Ceramic-Fiber/-Ceramic-Matrix Composites," *J. Am. Ceram. Soc.*, Vol. 68, No. 2, pp. 225-231, (1985); P. F. Becher, "Microstructural Design of Toughened Ceramics," *J. Am. Ceram. Soc.*, Vol. 74, No. 2, pp. 255-69, (1991).

The morphologies of the primary ceramic and metal phases (or the primary and secondary ceramic phases) of a composite can also play an important role in determining the electrical, optical, thermal, or magnetic properties, in addition to the mechanical properties, of the composite. For example, in an electrically superconducting oxide/normal metal composite, in which the oxide and metal phases are randomly dispersed, the volume fraction of superconducting oxide grains must be sufficiently high to provide a continuous superconduction path. Otherwise, the composite will not exhibit superconductive properties. On the other hand, the fracture toughness of the superconducting oxide/normal metal composite should improve as the volume fraction of the metal phase is increased (or as the volume fraction of the oxide phase is decreased). Thus, a trade-off between superconducting properties and mechanical properties must be made in optimizing the amounts of normal metal phase and superconducting oxide phase in a composite with a random dispersion of metal and oxide phases. A more desirable geometry for a superconducting oxide/normal metal composite is a microlaminate geometry, which is composed of thin, alternating layers of the superconducting oxide and the normal metal. With this geometry, the volume fraction of superconducting oxide phase required for a continuous path of superconduction is less than for a composite with randomly-dispersed oxide and metal phases. Thus, a microlaminate geometry allows for the use of more normal metal (i.e., higher fracture toughness) for the same degree of connectivity of the superconducting oxide phase.

Thus, a laminated composite geometry, composed of alternating layers of a primary ceramic and metal (or a primary oxide and a secondary ceramic) can be a preferred geometry for obtaining a desired combination of electrical, optical, thermal, magnetic, and/or mechanical properties. For example, a microlaminate body composed of alternating planar layers of a thermally-insulating ceramic phase and a normal metal can be thermally-insulating in a direction perpendicular to the planes, while retaining good fracture toughness due to the metallic layers.

One method of producing a composite of an ceramic and metal is to first form a precursor alloy which includes the metallic elements of the desired ceramic and at least one other metal. The alloy is then oxidized to form a composite of the with the other (non-oxidized) metal(s) of the alloy. (See for example, U.S. Pat. No. 4,826,808 "Preparation of Superconducting Oxides and Oxide Metal Composites," by Yurek, et al, incorporated herein by reference). The alloy is formed with a "noble" metal element where "noble" is defined in the sense that the oxidized noble metal is thermodynamically unstable under the reaction conditions employed to oxidize the other elements of the alloy. For example, a noble metal-bearing alloy can be oxidized under conditions that convert certain metallic elements of the alloy to a superconducting oxide without oxidizing the noble metal.

The noble metal is exsolved (e.g., precipitated) from the alloy during oxidation as a finely divided, substantially pure metal phase rather than as a second oxide phase. The noble metal phase is thus intimately mixed with the primary oxide phase.

One object of this invention is to provide a laminated ceramic-ceramic composite. Another object is to provide a laminated metal-ceramic composite, in which the ceramic phase contains multiple elements (herein a "multicomponent ceramic"). Another object is to provide a laminated ceramic body that resists mechanical failure. Another object is to provide a laminated ceramic body, in which at least one ceramic phase possesses desired electrical properties (e.g., electrically superconducting, or electrically semiconducting, or electrically metallic, or electrically insulating, or dielectric, or ionically conducting), or desired optical properties (e.g., optically conducting, or optically absorbing, or optically reflecting), or desired magnetic properties (e.g., ferromagnetic, or ferrimagnetic, or paramagnetic), or desired thermal properties (e.g., thermally conducting, or thermally insulating, or thermal-shock resistant), or desired mechanical properties (e.g., fracture-tough ceramics, or strong ceramics), or a combination of the above (e.g., piezoelectric, or pyroelectric, or electrooptic, or acoustooptic, or magnetooptic, or magnetostrictive). Another object includes providing a method of making such laminates that is reliable and avoids complex handling.

SUMMARY OF THE INVENTION

The invention relates to a method for producing a ceramic/metal or ceramic/ceramic composite with a laminate geometry. A precursor metal alloy, which includes metallic elements of a desired primary ceramic and a noble metal (or a desired primary ceramic and a desired secondary ceramic) is first formed. The alloy is then oxidized under conditions that convert at least two of the metallic elements of the alloy to ceramics, while at least one other element remains metallic (unoxidized). The oxidation process is conducted with alternating cycles of temperature and/or activity of an oxidizing agent to generate a microlaminate structure, consisting of alternating layers. One set of layers have a relatively high concentration of the at least two ceramics. These layers are separated by other layers having a relatively high concentration of the noble metal. At this point, the microlaminate body is a ceramic-metal composite. A further oxidation step may be conducted, after the microlaminate structure is formed, to completely oxidize the body, thereby yielding a microlaminate ceramic-ceramic composite.

The primary ceramic layers of a laminate include ceramics that exhibit desirable electrical, optical, magnetic, mechanical, or thermal properties. The secondary ceramic layers may also exhibit desirable properties which complement those of the primary.

For example, the metallic layers of a ceramic-metal laminate may include a noble metal, or noble metal alloy, that exhibits desirable mechanical properties (ductility, fracture toughness, strength), electrical properties (electrical conductivity), or thermal properties (thermal conductivity, thermal expansion coefficient). Potential noble metal elements include, but are not limited to, Ag, Au, Pt, Pd, Rh, Ir, Os, Hg, Cu, or Fe.

Secondary ceramic layers of a ceramic-ceramic laminate may include ceramics that exhibit desirable electrical, optical, magnetic, mechanical, or thermal properties that complement the properties of the primary ceramic layers.

During oxidation, the non-noble metal elements oxidize along an oxidation front that progresses through the metal alloy precursor. Oxidation is induced by exposing the metal alloy precursor to a first environment to form a layer with a first concentration of oxidized non-noble metal elements at the oxidation front. The precursor is then exposed to a second oxidizing environment to form a layer with a concentration of ceramic which is less than the first concentration. It should be noted, however, that the method can begin with either the first or second environment.

The first and second environments may include specific temperatures chosen to yield desired rates of diffusion of the non-noble metal elements toward the oxidation front. The environments also include an oxidizing agent, which could be in the form of a gas, liquid or solid. Specific values of the thermochemical activity of the oxidizing agent may be chosen for the first and second environments, so as to obtain desired rates of migration of the oxidizing agent through the metal precursor.

For example, if the metallic precursor is a silver-based alloy, in which the noble metal element is silver, the first environment may involve heating the precursor in an atmosphere with a low oxygen partial pressure at a high temperature. This oxygen-depleted atmosphere may be a reducing atmosphere consisting of a mixture of $CO + CO_2$ or $H_2 + H_2O$ or an inert gas, such as Ar or He. The second environment may involve heating the precursor in an atmosphere with a high oxygen partial pressure at a low temperature. This oxygen-rich atmosphere may be pure $O_2$, or a mixture of $O_2$ with another inert gas, such as Ar or He.

The precursor is alternately exposed to these environments to form a plurality of alternating layers with a high concentration of ceramic (i.e., low concentration of noble metal) and a low concentration of ceramic (i.e., high concentration of noble metal). To convert the laminated ceramic-metal composite to a laminated ceramic-ceramic composite, the laminated ceramic-metal composite can be exposed to a third environment which converts the unoxidized metal into the secondary ceramic phase.

A laminated microstructure is a desirable geometry for ceramic-metal or ceramic-ceramic composites. Alternating cycles of temperature and/or activity of the oxidizing agent, during oxidation of a metallic precursor alloy, provide an efficient technique for achieving such a laminated microstructure.

BRIEF DESCRIPTION OF THE DRAWINGS

FIGS. 4(a) and 4(b) are flow charts illustrating a preferred method for producing the microlaminate structure of FIG. 3.

DESCRIPTION OF THE PREFERRED EMBODIMENT

Figure 1:
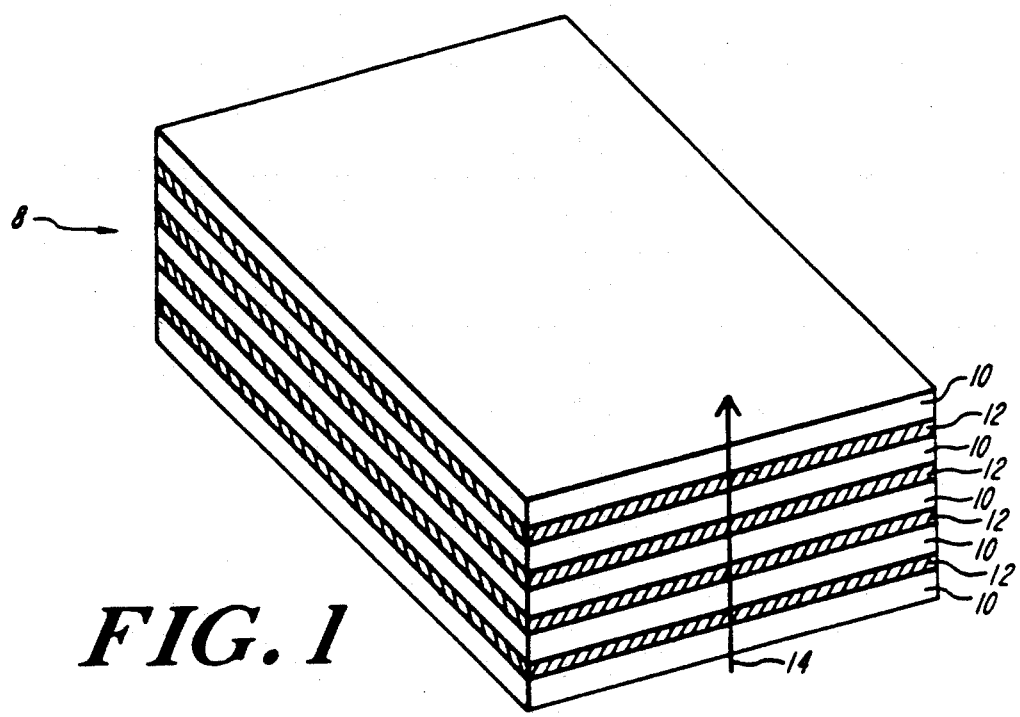
FIG. 1 is a schematic diagram of a micro-laminate structure having layers of a primary ceramic material separated by layers of either a metal, metal alloy or a secondary ceramic material.

Referring to FIG. 1, a microlaminate 8 consists of layers of substantially pure metal (or substantially pure secondary ceramic) 10 separated by layers of substantially pure primary ceramic 12. Crack propagation in a direction 14 perpendicular to the layers is particularly unlikely since the crack must pass through relatively ductile substantially pure metal layers 10.

The minimum concentration of primary ceramic grains in a composite necessary to maintain a continuous, connected path through the primary ceramic phase is known as the percolation limit. In microlaminate 8, the primary ceramic grains are concentrated densely in bands 12. Accordingly, the likelihood that any primary ceramic grain will make contact with a nearby primary ceramic grain is greater than if the primary ceramic grains were randomly distributed in a noble metal matrix over the entire volume of the structure. Hence, microlaminate 8 may contain a larger volume fraction of metal than a ceramic/metal composite with a random blend of metal and ceramic, without losing connectivity of the primary ceramic grains. Such connectivity is important if the primary ceramic phase in the composite is to be used, for example, for electrical or optical transmission.

According to a preferred method for producing microlaminate 8, a metal alloy precursor 20 (FIG. 2) is prepared from several metal species. Certain ("non-noble") metal species of the alloy are selected to have a relatively high affinity for reacting with oxygen, and to rapidly diffuse through the precursor at sufficiently high temperatures. As will be explained in more detail below, due to these properties of the non-noble metal, layers of dense ceramic of the non-noble metal separated by layers of the noble metal may be formed within the precursor 20 by selectively alternating the environment surrounding the precursor.

Figure 2:
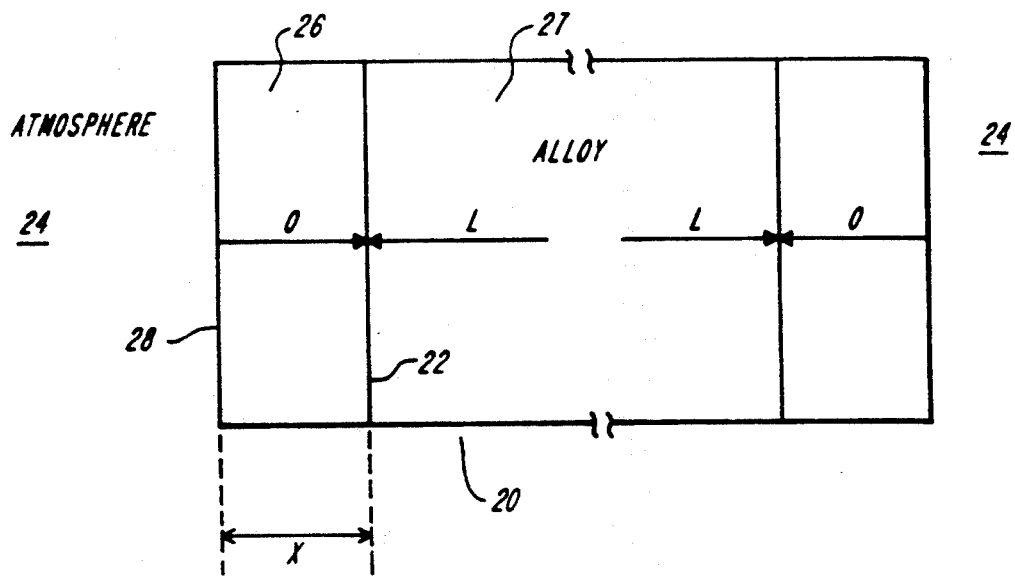
FIG. 2 is a cross section of a metal alloy undergoing internal oxidation.

Referring to FIG. 2, the precursor is exposed to an elevated temperature in an atmosphere 24. Atmosphere or environment 24, which supplies the oxidizing agent, may be either a gas, liquid or solid. Consider, in this example, oxygen as the oxidizing agent. The oxygen moves forward into the precursor and reacts with the less noble element L to form an oxide at the oxidation front 22. Region 26 is composed of oxidized element L and noble metal(s). Region 27 is composed of the unoxidized metal precursor. The concentration of the metallic, nonoxidized element L in the oxidized region 26 is significantly lower than the concentration of unoxidized element L in the unoxidized central region 27. The gradient in concentration of unoxidized element L caused by oxidation induces additional quantities of the less noble element L in region 27 to diffuse outward toward the incoming oxygen thereby supplying additional metal for reacting with the oxygen.

At the reaction front 22, the outwardly diffusing element L meets the incoming oxygen and reacts to form an oxide. Depending on the rate of diffusion of the element L in the metal precursor alloy in relation to the rate of diffusion of the oxygen through the oxidized region 26, the front may possess varying concentrations of oxide particles. If the outward migration of element L is suddenly increased relative to the inward migration of oxygen, the concentration of oxide particles forming at the reaction front may suddenly increase.

To form a layer with a high concentration of oxide particles, the temperature and the oxygen partial pressure of atmosphere 24 are selected to yield migration rates of L and oxygen which cause the concentration of oxide particles at the reaction front 22 to be high. Accordingly, the conditions are chosen such that the outward flux of element L occurs at a high rate (relative to the rate of inward oxygen diffusion) to the reaction front 22, where L reacts with the oxygen to form a high concentration of oxide particles. Thus, as the reaction front moves forward, it leaves a wake with a high concentration of metal oxide.

Similarly, to form a layer with a low concentration of oxide particles, the temperature and the oxygen partial pressure of atmosphere 24 are adjusted to raise the rate of inward oxygen migration and to lower the outward migration of L. Thus, the reaction front 22 moves forward, leaving a trail of relatively low concentration of metal oxide. By alternately changing the temperature and/or oxygen partial pressure in atmosphere 24, a plurality of layers may thus be formed.

The oxygen partial pressure can be reduced for example, by exposing the precursor to an inert atmosphere, i.e., an atmosphere with only a trace level of oxygen. Examples of inert atmospheres include, but are not limited to, pure He, Ar, $N_2$ and Ne. An inert atmosphere can be formed, for example, by passing an oxygen bearing gas (e.g., He containing a small amount of oxygen) through a getter (e.g., heated Mg) to remove oxygen. The oxygen partial pressure can also be lowered by exposing the precursor to a reducing atmosphere, i.e., an atmosphere containing a species that will react with oxygen, thereby removing oxygen from the atmosphere. Examples of reducing atmospheres include, but are not limited to, $H_2$, CO, $NO_z$, $SO_z$ (where $z > 1$).

At any given time, the velocity of the oxidation front 22 in a particular alloy depends on the temperature and oxygen pressure, and may be expressed as shown in the following equation $$dX/dt = g[D_O/t]^{\frac{1}{2}} \qquad (1)$$

where X is distance of the reaction front 22 from external surface 28 at time t; and $D_O$ is the diffusivity of oxygen through the noble metal. (See Rapp, "Kinetics, Microstructures, and Mechanism of Internal Oxidation—Its Effect and Prevention in High Temperature Alloy Oxidation," *Corrosion*, Vol. 21, pg. 382, 1965, incorporated herein by reference.) The term g can be expressed as $$g = [D_O/D_L]^{\frac{1}{2}} N_O/2n N_L \qquad (2)$$

where $N_O$ is the mole fraction of oxygen at the external surface 28 (assumed to be the solubility of oxygen in the noble metal); $N_L$ is the mole fraction of the less noble metal, L, in the bulk alloy 20; $D_L$ is the diffusivity of the less noble metal L; n is the number of oxygen ions which react with each L ion to form an oxide molecule; and p is 3.141593. (see Rapp) Equation 2 applies to the specific case where the ratio $N_O/N_L$ is very much less than the ratio of $D_L/D_O$ and wherein both ratios are very much less than one. The ratios have this relation if the diffusivity of the less noble element, L, is much lower than the diffusivity of oxygen in the noble metal and if the concentration of oxygen at the external surface is considerably lower than the concentration of the less noble element in the bulk alloy.

Another important term is the enrichment factor, a, which is defined as:

$$a = \{p^{\frac{1}{2}}g[D_O/D_L]^{\frac{1}{2}}\exp(g^2 D_O/D_L)\text{erfc}(g \cdot [D_O/D_L]^{\frac{1}{2}})\}^{-1} \quad (3)$$

where exp and rfc refer to the exponential and complementary error functions, respectively. The factor a describes the enrichment of the less noble element L, in the form of the oxide of L, in the zone of internal oxidation 26, relative to the concentration of L in the starting metal precursor alloy 20. (see Rapp) Equations 1-3 can be used to describe the rate of internal oxidation, and the relative concentration of the less noble metal elements, L, in the zone of internal oxidation.

If the temperature and/or oxygen pressure change, then a corresponding change can result in the velocity dX/dt of the oxidation front and the enrichment factor a. The temperature dependence in equations 1-3 enters into the $N_O$, $D_O$, and $D_L$ terms. The oxygen pressure dependence enters into the $N_O$ term. The effect of temperature on the ratio $D_O/D_L$ depends on the species of the less noble element L and the noble metal. For example, $D_O/D_L$ increases with decreasing temperature for silver-based alloys where the less noble element L comprises at least one of Cd, In, Sn, Sb and Cu, while $D_O/D_L$ decreases with decreasing temperature in copper-based alloys where L comprises at least one of Al, Si, Zn and Be. J. L. Meijering, and M. J. Druyvesteyn, "Hardening of Metals by Internal Oxidation," *Phillips Res. Rep.*, Vol. 2, pp. 81, 260, 1947.

Consider, for example, a decrease in both oxygen partial pressure and temperature during the oxidation of a Cu-based alloy. $D_O/D_L$ and $N_O$ would decrease, resulting in a decrease in the velocity, dX/dt, of the oxidation front 22 and a local increase in the enrichment factor a. In other words, the concentration of oxide particles forming at the oxidation front 22 would increase. Such changes in oxygen partial pressure and temperature can be made to occur at desired times during oxidation, thereby yielding desired changes in the concentration of oxide particles at particular locations, X. Oscillating the oxygen partial pressure and/or temperature during oxidation produces zones of relatively high oxide concentration separated by zones of relatively low oxide concentration. The zone of relatively low oxide concentration consists mostly of the unoxidized noble metal. However, after formation of such an oxide-metal laminate, a final heat treatment may be conducted to oxidize the noble metal element to produce a laminated ceramic-ceramic body.

This process of producing ceramic-metal or ceramic-ceramic laminates by forming oxidation zones with varying concentrations of oxide particles can be applied to metal precursors with more than one non-noble element. Each non-noble element possesses a specific diffusion coefficient (at a given temperature) and concentration in the metal precursor alloy. Consequently, a specific oxidation front 22 will exist for each non-noble element; the oxidation front for a specific element will possess a specific enrichment factor, a, and will move at a specific velocity, dX/dt. The velocity and, therefore, position of the oxidation front of one non-noble element may be different from that of another non-noble element at a given time during oxidation. Consequently, a region with a high concentration of oxide particles of one non-noble element may not completely overlap a region with a high concentration of oxide particles in another non-noble element, even if both high concentration regions were formed by the same conditions of oxygen partial pressure and/or temperature. Careful selection of non-noble elements and temperature and oxygen partial pressure during oxidation is required to obtain desired distributions of the oxides of multiple non-noble metal elements.

For example, consider the preparation of a ceramic-metal laminate consisting of alternating layers of a multicomponent oxide phase and a noble metal phase. The multicomponent oxide phase is formed by the reaction of the component oxides. In order to form layers with a high concentration of the multicomponent oxide phase, the individual component oxide phases must first be concentrated together. Toward this end, the oxidation process is conducted to form layers with a high concentration of the oxide phases formed from each of several non-noble elements. The position of the oxidation front for each non-noble element and the concentration of oxide particles at that front for each non-noble element at any given time during oxidation depend upon the inward flux of oxygen and the outward flux of each non-noble element. The relative magnitude of these fluxes depend upon the diffusion coefficients of the specific non-noble elements, the diffusion coefficient of oxygen, and the concentration of the non-noble elements in the metal precursor. Thus, a proper choice of the type and concentrations of non-noble elements, and proper variations in temperature and oxygen partial pressure during oxidation must be made to obtain layers containing high concentrations of multiple oxide phases.

The process of forming layers with varying concentrations of ceramic particles can also involve the application of an electric potential. Sudden variations in the magnitude of the applied electric potential may also cause sudden variations in the concentration of ceramic particles at the oxidation front. Thus, the general method discussed herein for forming ceramic laminates includes varying an applied electric potential during oxidation.

The process for forming a mixture of discrete oxide particles in a noble metal matrix by oxidizing a metal precursor alloy is known as "internal oxidation". The following criteria must be satisfied in order for internal oxidation to occur in a binary alloy of a noble element and a less noble element at constant temperature and oxygen pressure 1) the free energy of formation (per mole of oxygen) for the less noble (solute) metal oxide in the bulk alloy must be more negative than the free energy of formation (per mole of oxygen) of the lowest oxide of the noble base metal, 2) the solubility and diffusivity of atomic oxygen must be sufficiently high in the lattice of the pure noble (solvent) metal that the required activity of oxygen to form the less noble (solute) metal oxide at the oxidation reaction front is achieved, 3) the less noble (solute) metal content of the bulk alloy must be lower than that required to cause the transition from internal to completely external oxidation, and 4) a surface layer formed in the preparation of the alloy surface must not prevent the dissolution of oxygen in the noble (solvent) metal.

Internal oxidation without external scale formation occurs in dilute silver alloys since silver is a relatively noble metal ($Ag_2O$ is thermodynamically unstable above 180° C. in air). Silver is also relatively inert to reaction with oxide phases; for example, silver is one of the few metals that do not seriously degrade the superconducting properties of oxide-based superconductors. Other useful, relatively noble, metals include, but are not limited to, Au, Pt, Pd, Rh, Ir, Os, Hg, and Cu.

EXAMPLE 1

The following example illustrates the use of the above described process to form a laminated superconductor. A metal alloy precursor containing the elements Y, Ba, Cu, and Ag, in the molar ratio YBaCuAg=1:2:3:X (where X>0), is first prepared by melting the elements and rapidly solidifying the molten alloy on a spinning chill wheel to form a metallic precursor tape. The metal precursor tape is then exposed to a series of heat treatment steps during which the element Ag remains noble (unoxidized). (Ag remains noble at temperatures above 180° C. in an environment with an oxygen partial pressure less than or equal to 1 atmosphere).

The precursor tape is first exposed to an oxidizing environment which causes oxygen to diffuse into the alloy. The elements Y, Ba, and Cu diffuse outward through the alloy at a rapid rate (relative to oxygen inward diffusion) and react with the incoming oxygen to form the oxides $Y_2O_3$, BaO, and $Cu_yO$ (y=1 and/or 2). This step creates a layer that has a relatively high concentration of oxide particles ($Y_2O_3$, BaO, and $Cu_yO$) and a relatively low concentration of the noble element, Ag. Because the outward diffusion of Y, Ba, and Cu is relatively fast, the unoxidized alloy adjacent to the oxidized zone may become depleted in the non-noble elements Y, Ba, and Cu and enriched in the noble metal element, Ag.

The precursor is then exposed to an environment which causes the oxygen to diffuse inward at a rate that is rapid relative to the rate of diffusion of Y, Ba, and Cu outward. This step creates a layer that is rich in the noble element, Ag, and contains relatively few particles of $Y_2O_3$, BaO, $Cu_yO$. The low concentration of oxide particles is due to the relatively slow outward diffusion of Y, Ba, and Cu during this cycle, and to the depletion of these elements in this layer during the previous oxidation cycle.

After a number of cycles are conducted to form the desired number of layers, the body is further heated to transform the individual oxides $Y_2O_3$, BaO, $Cu_yO$ (y=1 and/or 2) into the superconducting oxide, $YBa_2Cu_3O_{7-x}$. However, during this further heating, the body retains its laminate structure since the individual oxides species $Y_2O_3$, BaO, $Cu_yO$ do not migrate into the Ag rich layers. Accordingly, after the conversion, the body contains layers having a high concentration of superconducting oxide separated by layers having low concentration of superconducting oxide, and a relatively large concentration of the noble metal, Ag.

Figure 3:
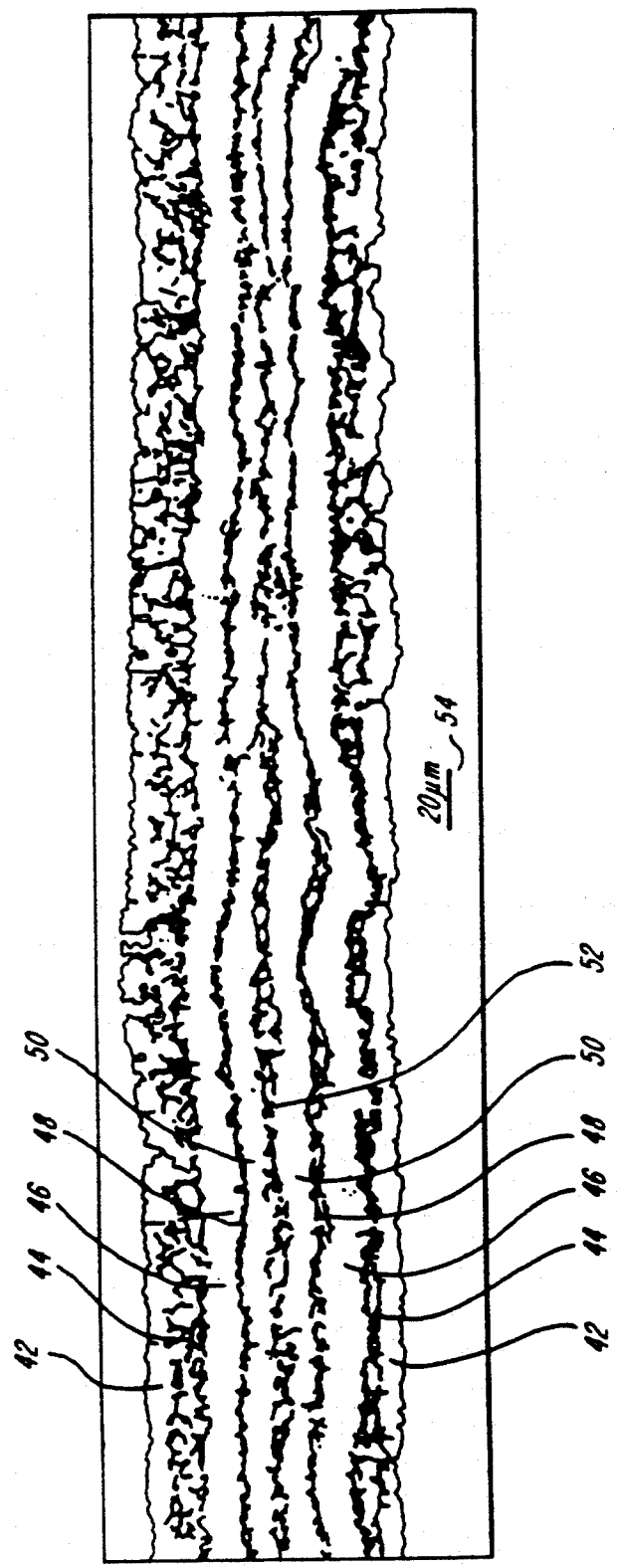
FIG. 3 is a cross sectional micrograph view of a $Ag/YBa_2Cu_3O_{7-x}$ composite with a micro-laminate structure.

FIG. 3 illustrates a laminated microstructure 40 composed of superconducting $YBa_2Cu_3O_{7-x}$ (dark phase) and Ag (bright phase) produced from such alternating cycles of heat treatment. Referring to FIGS. 3 and 4, to achieve this microstructure, a precursor of $YBa_2Cu_3Ag_{29}$ is first formed. (Step 100). The precursor is then heated in an atmosphere of substantially pure oxygen at approximately 200° to 930° C., and preferably at 400° C. for one hour. (Step 102). This step rapidly drives oxygen into the precursor to form a pair of layers 44, which are composed of oxide particles ($Y_2O_3$, BaO, $Cu_yO$, y=1 and/or 2) and the noble element, Ag. Next, the precursor is heated at approximately 200°-960° C. and preferably at 600° C. in a helium-rich, oxygen-poor atmosphere for approximately 20 minutes. (Step 104). The lowered oxygen partial pressure slows the rate of oxygen migration while the increased temperature (i.e., 600° C.) causes the elements Y, Ba, and Cu to rapidly diffuse outward. Accordingly, the reaction fronts move slowly, or stop moving, during this cycle.

A silver-rich layer 46 forms as a result of a depletion of Y, Ba, and Cu, which have diffused outward to the inner edge of layer 44, during step 104. The concentration of oxygen dissolved in the silver phase in layers 44 is also decreased during step 104. (The concentration of oxygen dissolved in Ag is decreased as the oxygen content of the environment, in which Ag is equilibrated, decreased.)

The precursor is then re-exposed to the pure oxygen environment for three hours. (Step 106). Consequently, the oxygen diffuses back through layers 44 and 46 during step 106. The precursor is then exposed to the He-rich, oxygen-poor environment for 20 minutes at 600° C. to form oxide layers 48. (Step 108). The Ag-rich layers 50 also form during step 108, due to the outward diffusion of the Y, Ba, and Cu during the formation of layers 48.

The precursor is returned to the pure oxygen environment for 20 hours (Step 110) to form layer 52, which is composed of oxide and Ag.

To convert the individual oxides $Y_2O_3$, BaO, $Cu_yO$ in layers 44, 48, and 52 to the superconducting oxide $YBa_2Cu_3O_{7-x}$, the layered precursor 40 is heated to 900° C. in an atmosphere of pure oxygen, held for 5 hours, and then cooled to 500° C. and held for 20 hours. (Steps 112, 114). The integrity of the individual layers formed during steps 102, 104, 106, 108 and 110 is maintained, since the migration of oxide species into the Ag-rich layers 46 and 50 is sufficiently slow.

Samples made by this process exhibited a zero-resistance critical temperature Tc, of 88° K. and an engineering critical current density (the critical current density through the entire ribbon), Jc, of 200 A/cm$^2$ at 77° K. with zero applied magnetic field. From FIG. 3, it appears that the percentage of the with high and low concentrations of $Y_2O_3$ and BaO (and/or compounds containing $Y_2O_3$ and BaO) respectively can be produced. Each band also contains high or low concentrations of non-oxidized (noble) Cu and Ag. After the formation of the bands, the body is then heat treated to cause the copper to oxidize and react with the other oxide phases to form layers rich in the superconducting oxide $YBa_2Cu_3O_{7-x}$ separated by layers rich in Ag plus oxidized Cu. For example, one such heat treatment includes heating the body in oxygen at 900° C., and then cooling the body to 500° C. in oxygen.

EXAMPLE 3

The following example illustrates the use of the lamination process to form a superconducting laminate having primary superconducting oxide layers separated by secondary nonsuperconducting oxide layers. A precursor alloy, composed of $YBa_2Cu_{3+x}$ (x>0), is prepared by mechanical alloying. The alloy powder is packed into a silver tube, which is then sealed. The packed tube is deformed into a tape by extrusion, rolling, pressing or other well known deformation techniques. As a result, the silver tube is shaped into a protective outer sheath which protects the inner alloy material. Such deformation may be conducted at ambient temperature or at elevated temperatures.

The metallic precursor is then oxidized under conditions in which the oxygen diffuses inward through the Ag sheathing and into the alloy core. The Ba and Y diffuse outward and oxidize while Cu (and the Ag sheath) remain metallic (noble). For example, selective diffusion and oxidation of Y and Ba can be conducted by cross-sectional area of the ribbon that contains superconducting oxide (the dark phase) is roughly 20 to 25%. The critical current density flowing through the superconducting oxide phase alone is estimated from FIG. 3 to be greater than 800 A/cm$^2$.

The micron marker 54 in FIG. 3 shows that the silver-rich layers are about 20 microns thick, and the oxide-rich layers are about 2-20 microns thick.

EXAMPLE 2

As another example, the same precursor tape as above can instead be exposed to an oxidizing environment in which both the elements Cu and Ag remain noble while the elements Y and Ba diffuse and oxidize. For example, Cu remains metallic above 600° C. in an atmosphere with an oxygen pressure below about $10^{-12}$ atmospheres. L. B. Pankratz, J. M. Stuve, N. A. Gokcen, "Thermodynamic Data for Mineral Technology," Bulletin 677, U.S. Dept. of Interior, Bureau of Mines; 1984, M. W. Chase, Jr., C. A. Davies, J. R. Downey, Jr., D. J. Frurip, R. A. McDonald, and A. N. Syverud, JANAF Thermochemical Tables, Third Edition, Parts I, II, *J. of Phys. and Chem. Ref. Data*, Vol. 14, 1985.

Under conditions in which Cu and Ag remain noble (metallic), selective diffusion and oxidation of Y and Ba can be conducted by alternating the oxygen pressure from a lower value to a higher value or by alternating the temperature from a higher value to a lower value or both. For example, the temperature may be oscillated from 200° to 780° C., with the oxygen partial pressure kept below $10^{-30}$ and $10^{-9}$ atmospheres for 200° and 780° C., respectively, in order to keep Cu metallic. In this manner, alternating bands alternating the oxygen pressure from a lower value to a higher value or by alternating the temperature from a higher value to a lower value or both. The temperature may be oscillated from 200° to 780° C., with the oxygen partial pressure kept below $10^{-30}$ and $10^{-9}$ atmospheres for 200° and 780° C., respectively, in order to keep Cu metallic. In this manner, alternating bands of high and low concentrations of $Y_2O_3$ and BaO (and/or compounds containing $Y_2O_3$ and BaO) can be produced. Each band also contains low or high concentrations of non-oxidized (noble) Cu. After the formation of the bands, the body is then heat treated to cause the copper to oxidize and react with the other oxide phases to form layers rich in the superconducting oxide $YBa_2Cu_3O_{7-x}$ separated by layers rich in oxidized Cu. One such heat treatment includes heating the body in oxygen at 900° C., and then cooling the body to 500° C. in oxygen. This yields a laminate whose primary ceramic phase is a superconducting metal oxide and whose secondary ceramic phase is a non-superconducting metal oxide. The laminate is surrounded by the protective sheath of Ag which protect the laminate from abrasion and other potentially damaging environments.

EXAMPLE 4

The following illustrates the use of the lamination process to form a multilayer capacitor composed of alternating layers of a metallic conductor (Ag) and a dielectric ($BaTiO_3$). A metal alloy precursor film containing the elements Ba, Ti, and Ag, in the molar ratio Ba:Ti:Ag=1:1:X (where X>0), is first prepared by sputtering the elements from a target (or several targets) onto a substrate. The alloy film is then exposed to a series of heat treatment steps during which the element Ag remains noble (unoxidized). The precursor is first exposed to an environment (e.g., 700° C. in a mixture of 0.1% $O_2$ in Ar) which causes the elements Ba, and Ti to diffuse outward through the alloy at a rapid rate (relative to oxygen inward diffusion) and react with the incoming oxygen to form the oxides BaO, and $TiO_2$. This step creates a layer that has a relatively high concentration of oxide particles (BaO, and $TiO_2$) and a relatively low concentration of the noble element, Ag. Because the outward diffusion of Ba and Ti is relatively fast, the unoxidized alloy adjacent to the oxidized zone may become depleted in the non-noble elements Ba and Ti and enriched in the noble metal element, Ag.

The precursor is then exposed to an environment (e.g., 500° C. in pure $O_2$) which causes the oxygen to migrate inward at a rate that is rapid relative to the rate of diffusion of Ba and Ti outward. This step creates a layer that is rich in the noble element, Ag, and contains relatively few particles of BaO and $TiO_2$. The low concentration of oxide particles is due to the relatively slow outward diffusion of Ba and Ti during this cycle, and to the depletion of these elements in this layer during the previous oxidation cycle.

After the metal precursor has been alternately exposed to a number of such cycles, so as to form the desired number of layers, the body is further heated (e.g., 900° C. in air) to transform the individual oxides BaO and $TiO_2$ into the dielectric oxide, $BaTiO_3$. However, during this further heating, the body retains its laminate structure since the migration of the individual oxide species BaO and $TiO_2$ into the Ag rich layers is slow. Accordingly, after the conversion, the body contains alternating layers of high concentration of $BaTiO_3$ and low concentration of $BaTiO_3$, with the low concentration oxide layer containing a relatively large concentration of the noble metal, Ag.

EXAMPLE 5

Since the silver used in the multilayer capacitor of Example 4 is relatively expensive, the following describes a technique for forming a multilayer capacitor composed of alternating layers of the metallic conductor Cu and a dielectric (acceptor-doped $BaTiO_3$).

An alloy of $Ba_1Ti_{1-x}A_xCu_y$ (x>0, y>0), in which A is an acceptor dopant (e.g., $Na^{+1}$ substituted for $Ba^{+2}$ or $Ga^3$, $Sb^{+3}$, $Fe^{+2}$, or $La^{+3}$ substituted for $Ti^{+4}$), is prepared by sputtering the elements from a target (or several targets) onto a substrate. In this alloy, the inexpensive Cu replaces the expensive silver used in Example 4. Due to this substitution, the lamination process requires a different oxidizing environment which tends to degrade the dielectric properties of $BaTiO_3$. Accordingly, the $BaTiO_3$ is doped with an acceptor dopant A to assure that it will retain its dielectric properties after the lamination cycles.

The precursor film is exposed to an environment in which both the elements Cu and Ag remain noble while the elements Ba, Ti, and the acceptor element, A, diffuse and oxidize. For example, Cu remains metallic above 600° C. in an atmosphere with an oxygen pressure below about $10^{-12}$ atmospheres. L. B. Pankratz, J. M. Stuve, N. A. Gokcen, "Thermodynamic Data for Mineral Technology," Bulletin 677, U.S. Dept. of Interior, Bureau of Mines; 1984, M. W. Chase, Jr., C. A. Davies, J. R. Downey, Jr., D. J. Frurip, R. A. McDonald, and A. N. Syverud, JANAF Thermochemical Tables, Third Edition, Parts I, II, *J. of Phys. and Chem. Ref. Data*, Vol 14, 1985.

Under conditions in which Cu and Ag remain noble (metallic), selective diffusion and oxidation of Ba, Ti, and A can be conducted by alternating the oxygen pressure from a lower value to a higher value or by alternating the temperature from a higher value to a lower value or both. For example, the temperature may be oscillated from 200° to 700° C., with the oxygen partial pressure kept below $10^{-30}$ and $10^{-11}$ atmospheres for 200° and 700° C., respectively, in order to keep Cu metallic. In this manner, alternating bands with high and low concentrations of BaO, $TiO_2$, and $AO_z$ can be produced. Each band also contains low or high concentrations of non-oxidized (noble) Cu. After the formation of the bands, the body is heat treated (e.g., 900° C. in an environment with an oxygen partial pressure below $10^{-8}$ atmospheres) to cause the reaction of the oxide phases BaO, $TiO_2$, and $AO_z$ to form layers rich in the oxide $BaTi_{1-x}A_xO_3$ separated by layers rich in unoxidized Cu.

EXAMPLE 6

The following example illustrates the use of the lamination process to form a laminate whose primary ceramic phase exhibits ionic conductivity. Such laminates are useful as oxygen sensors, and oxygen pumps.

The laminate is composed of alternating layers of Ag and stabilized $ZrO_2$ and is produced as follows. An alloy of $Y_{0.1}Zr_{0.7}Ag_x$ (where $x>0$) is produced by rapidly casting a molten alloy (heated to temperatures above 1400° C.) onto a spinning wheel, so as to form ribbons (so-called melt spinning). The ribbons are then pulverized into metal precursor powder. The powder is then hot isostatically pressed into a dense rod.

The rod is then exposed to a series of heat treatment steps during which the element Ag remains noble (unoxidized). The precursor is first exposed to an environment (e.g., 700° C. in a mixture of 0.1% $O_2$ in Ar) which causes the elements Zr and Y to diffuse outward through the alloy at a rapid rate (relative to oxygen inward diffusion) and react with the incoming oxygen to form the oxides $ZrO_2$, and $Y_2O_3$. This step creates a layer that has a relatively high concentration of oxide particles ($ZrO_2$, and $Y_2O_3$) and a relatively low concentration of the noble element, Ag. Because the outward diffusion of Zr and Y is relatively fast, the unoxidized alloy adjacent to the oxidized zone may become depleted in the non-noble elements Zr and Y and enriched in the noble metal element, Ag.

The precursor is then exposed to an environment (e.g., 500° C. in pure $O_2$) which causes the oxygen to migrate inward at a rate that is rapid relative to the rate of diffusion of Zr and Y outward. This step creates a layer that is rich in the noble element, Ag, and contains relatively few particles of $ZrO_2$ and $Y_2O_3$. The low concentration of oxide particles is due to the relatively slow outward diffusion of Zr and Y during this cycle, and to the depletion of these elements in this layer during the previous oxidation cycle.

After the metal precursor has been alternately exposed to a number of such cycles, so as to form the desired number of layers, the body is further heated (e.g., 900° C. in air) to transform the individual oxides $Y_2O_3$ and $ZrO_2$ into yttria-stabilized zirconia, $Y_{0.1}Zr_{0.7}O_{2-y}$ ($y>0$). However, during this further heating, the body retains its laminate structure since the migration of the individual oxides species $Y_2O_3$ and $ZrO_2$ into the Ag-rich layers is slow. Accordingly, after the conversion, the body contains alternating layers with high and low concentrations of $Y_{0.1}Zr_{0.7}O_y$, with the low concentration oxide layer containing a relatively large concentration of the noble metal, Ag.

Oscillations in temperature and/or oxygen partial pressure during oxidation of a metal precursor alloy can also be used to form other ceramic-metal or ceramic-ceramic laminated composites in which the primary oxide phase possesses desirable electrical, optical, magnetic, thermal, or mechanical properties. Silver and copper or other elements (so-called "noble" elements that can be kept unoxidized during heat treatments that cause accompanying elements of the primary ceramic phase to oxidize) can be used as the noble metal phase in a ceramic-metal composite or as part of the precursor to the secondary ceramic phase in a ceramic-ceramic composite.

The ceramic-metal or ceramic-ceramic laminates may assume various shapes, including, but not limited to, rods with rectangular, square, round, elliptical, hexagonal, or triangular cross-sections; cubes; disks; or spheres.

The foregoing discussion should be taken as illustrative and not limiting in any sense. In this regard, it should be noted that the above discussion includes the inventor's present theory of how alternating cycles of temperature and/or oxygen partial pressure mobilize certain elements to yield a laminated microstructure. However, the inventor's methods of yielding a laminated microstructure are in no way limited to this proposed theory.

The primary ceramic phase may include:

a) electrically superconducting ceramics, including, but not limited to $La_{2-x}M_xCuO_y$, where M is an alkaline earth element; $R_aBa_bCu_cO_y$, where R includes a rare-earth element, and where the subscripts a, b, and c are in the ratio 1:2:3, 2:4:7, or 1:2:4; $(M_{1-x}Q_x)_aL_bCa_cCu_dO_y$, where M comprises at least one element from the group Bi, Tl, where Q comprises at least one element from the group Pb, Sb, where L comprises an alkaline earth species, and where the ratio of abcd comprises 2:2:n:n+1, 1:2:n:n+1, 1:1:n:n+1, 2:1:n:n+1, where n is a positive integer; $Pb_aSr_bM_cCu_dO_x$, where M comprises a rare earth element or an alkaline earth element, where the ratio abcd is 2:2:1:3; $BaPb_{1-x}Bi_xO_3$; $Ba_xK_{1-x}BiO_3$;

b) electrically conducting ceramics, including, but not limited to, $ReO_3$; $ReO_2$; $CrO_2$; $RuO_2$; $RhO_2$; $OsO_2$; $IrO_2$; $WO_2$; $VO$; $V_2O_3$; $VO_2$; $TiO$; $Ti_2O_3$; $NbO$; $TaO$; $MoO_2$; $MnO$; $MnO_2$; $SrVO_3$; $LaNiO_3$; $La_{1-x}CoO_3$; $M_xWO_3$, where M is an alkali ion, such as Na+, H+, K+, Li+; and superconducting metal oxides (see a above) that are used above the critical temperature, critical field, or critical current;

c) electrically semiconducting ceramics, including, but not limited to, $Fe_3O_4$; $Fe_2O_3$; NiO; $TiO_2$; $Ag_2O$; ZnO; bismuth-doped ZnO; $Cu_2O$; $In_2O_3$; tin-doped $In_2O_3$; $SnO_2$; antimony-doped $SnO_2$; CdO; PdO; CoO; SiC; CdS; CdSe; CdTe; PbS; PbSe; PbTe; GaAs;

d) electrically insulating or dielectric ceramics, including, but not limited to, MgO; BeO; $ZrO_2$; $HfO_2$; $CeO_2$; BN; $Si_3N_4$; $CaF_2$; LiF; NaCl; $MBO_3$, where M refers to an alkaline earth ion (or mixture of alkaline earth ions), such as $Ba^{+2}$, $Ca^{+2}$, $Sr^{+2}$, or $Pb^{+2}$, or $La^{+3}$, (or a mixture of $Pb^{+2}$ and/or $La^{+3}$ with alkaline earth ions) and B is $Ti^{+4}$, $Zr^{+4}$, or a mixture of $Ti^{+4}$ and $Zr^{+4}$; $BaTi_4O_9$; $M(B_xNb_{1-x})O_3$, where M refers to $Pb^{+2}$, $Ba^{+2}$, $Li^{+1}$, $K^{+1}$, and B refers to $Zn^{+2}$, $Fe^{+2}$, $Fe^{+3}$, $Ti^{+4}$, $Mg^{+2}$, $Sc^{+3}$, or a mixture of two of more of these ions; $M(B_xW_{1-x})O_3$, where M refers to $Pb^{+2}$, and B refers to $Fe^{+2}$, $Ni^{+2}$, $Mg^{+2}$, $Li^{+1}$, or a mixture of two or more of these ions; $MFe_{12}O_{19}$, where M refers to alkaline earth ions, such as $Ba^{+2}$, $Sr^{+2}$, $Ca^{+2}$; $M(B_xTa_{1-x})O_3$, where M refers to $Pb^{+2}$, $Ba^{+2}$ and B refers to $Sc^{+3}$, $Zr^{+4}$, $Zn^{+2}$, $Sn^{+4}$, or a mixture of two or more of these ions;

e) ionically conducting ceramics, including, but not limited to, $ZrO_2$; $(M_xZr_{1-x})O_2$ (stabilized zirconia), where M refers to an alkaline earth ion such as $Ca^{+2}$, $Sr^{+2}$, or a rare-earth ion, such as $Y^{+3}$; $CeO_2$; $(M_xCe_{1-x})O_2$, where M refers to an alkaline earth ion such as $Ca^{+2}$, $Sr^{+2}$ or a rare-earth ion such as $Y^{+3}$; $ThO_2$; $(M_xTh_{1-x})O_2$, where M refers to an alkaline earth ion such as $Ca^{+2}$, $Sr^{+2}$ or a rare-earth ion such as $Y^{+2}$; MX, where M refers to an alkali ion such as $Na^{+1}$, $K^{+1}$, $Li^{+1}$ and X refers to a halide ion, such as $Cl^{-1}$, $F^{-1}$, $Br^{-1}$, $I^{-1}$; AgX, where X refers to a halide ion, such as $Cl^{-1}$, $F^{-1}$, $Br^{-1}$, $I^{-1}$; CuX, where X refers to a halide ion, such as $Cl^{-1}$, $F^{-1}$, $Br^{-1}$, $I^{-1}$;

f) optically conducting ceramics, including, but not limited to, $MNbO_3$, where M is an alkali ion, such as $Li^{+1}$, $K^{+1}$; GaAs; ZnS; ZnSe; MX, where M refers to an alkali ion such as $Na^{+1}$, $K^{+1}$, $Cs^{+1}$ and X refers to a halide ion, such as $Cl^{-1}$, $Br^{-1}$, $I^{-1}$; $MX_2$, where M refers to an alkaline earth ion such as $Mg^{+2}$, $Ba^{+2}$, $Sr^{+2}$ and X refers to a halide ion, such as $Cl^{-1}$, $Br^{-1}$, $I^{-1}$; CdTe; CdS; $CdF_2$; $PbF_2$; and AgX, where X refers to a halide ion, such as $Cl^{-1}$, $Br^{-1}$, $I^{-1}$; MgO; $TiO_2$; $MBO_3$, where M refers to an alkaline earth ion (or mixture of alkaline earth ions), such as $Ba^{+2}$, $Ca^{+2}$, $Sr^{+2}$, or $Pb^{+2}$, or $La^{+3}$, (or a mixture of $Pb^{+2}$ and/or $La^{+3}$ with alkaline earth ions) and B is $Ti^{+4}$, $Zr^{+4}$, or a mixture of $Ti^{+4}$ and $Zr^{+4}$;

g) ferromagnetic or ferrimagnetic ceramics, including, but not limited to, $MO.Fe_2O_3$ (spinel ferrites), where M is a divalent ion, such as $Ni^{+2}$, $Cu^{+2}$, $Fe^{+2}$, $Mg^{+2}$, $Co^{+2}$, $Zn^{+2}$, $Mn^{+2}$, or a mixture of divalent ions; $MO.MnO_3$, where M is a divalent ion, such as $Co^{+2}$, $Ni^{+2}$; or $M_3Fe_5O_{12}$ (garnets), where M is a rare earth ion such as $Y^{+3}$, $La^{+3}$, $Pr^{+3}$, $Nd^{+3}$, $Sm^{+3}$, $Eu^{+3}$, $Gd^{+3}$, $Dy^{+3}$, $Ho^{+3}$, $Er^{+3}$, $Tm^{+3}$, $Yb^{+3}$, or $Lu^{+3}$; $MO.TiO_2$, where M is a divalent ion, such as $Ba^{+2}$, $Sr^{+2}$, $Mn^{+2}$, $Co^{+2}$, $Ni^{+2}$; $AB_{12}O_{19}$ (hexagonal ferrites), where A is a divalent ion such as $Ba^{+2}$, $Sr^{+2}$, $Pb^{+2}$ and B is a trivalent ion such as $Al^{+3}$, $Ga^{+3}$, $Cr^{+3}$, $Fe^{+3}$;

h) thermally conducting ceramics, including, but not limited to, SiC, BeO, $B_2O_3$, BN, AlN, $Si_3N_4$;

i) fracture-tough ceramics, including, but not limited to, $(M_xZr_{1-x})O_2$ (stabilized zirconia) where M refers to a stabilizing dopant, such as $Ca^{+2}$, $Mg^{+2}$, $Y^{+3}$; and j) ceramics exhibiting a combination of the properties a) through i). Such ceramics include, but are not limited to, l) piezoelectric ceramics, including, but not limited to, $MBO_3$, where M refers to an alkaline earth ion (or mixture of alkaline earth ions), such as $Ba^{+2}$, $Ca^{+2}$, $Sr^{+2}$, or $Pb^{+2}$, or $La^{+3}$, (or a mixture of $Pb^{+2}$ and/or $La^{+3}$ with alkaline earth ions) and B is $Ti^{+4}$, $Zr^{+4}$, or a mixture of $Ti^{+4}$ and $Zr^{+4}$;

2) pyroelectric ceramics, including, but not limited to, $MBO_3$, where M refers to an alkaline earth ion (or mixture of alkaline earth ions), such as $Ba^{+2}$, $Ca^{+2}$, $Sr^{+2}$, or $Pb^{+2}$, or $La^{+3}$, (or a mixture of $Pb^{+2}$ and/or $La^{+3}$ with alkaline earth ions) and B is $Ti^{+4}$, $Zr^{+4}$, or a mixture of $Ti^{+4}$ and $Zr^{+4}$;

3) electrooptic ceramics, including, but not limited to, $MNbO_3$, where M refers to an alkali ion, such as $Li^{+1}$, $K^{+1}$; $MTaO_3$, where M refers to an alkali ion, such as $Li^{+1}$, $K^{+1}$; $M_2Nb_2O_7$, where M refers to an alkaline earth ion, such as $Ca^{+2}$, $Ba^{+2}$; $Sr_xBa_{1-x}Nb_2O_6$; $KH_2PO_4$, $K(Ta_xNb_{1-x})O_3$; $BaNaNb_5O_{15}$; $MBO_3$, where M refers to an alkaline earth ion (or mixture of alkaline earth ions), such as $Ba^{+2}$, $Ca^{+2}$, $Sr^{+2}$, or $Pb^{+2}$, or $La^{+3}$, (or a mixture of $Pb^{+2}$ and/or $La^{+3}$ with alkaline earth ions) and B is $Ti^{+4}$, $Zr^{+4}$, or a mixture of $Ti^{+4}$ and $Zr^{+4}$;

4) acoustooptic ceramics, including, but not limited to, $LiNbO_3$, $LiTaO_3$, $PbMoO_4$, $PbMoO_5$; and 5) magnetostrictive ceramics, including, but not limited to, $MO.Fe_2O_3$ (spinel ferrites), where M is a divalent ion, such as $Ni^{+2}$, $Cu^{+2}$, $Fe^{+2}$, $Mg^{+2}$, $Co^{+2}$, $Zn^{+2}$, $Mn^{+2}$, or a mixture of divalent ions.

The above described process for producing a laminated microstructure may also be used to align the crystals of a primary ceramic phase to yield desired properties. The transport critical current density, $J_{c,t}$, of high-$T_c$ superconductors has also been found to be strongly related to the degree of crystallographic misorientation between neighboring superconducting oxide grains. The $J_{c,t}$ drops dramatically as the degree of misorientation increases. This drop is thought to be due to an increase in the structural disorder of the oxide grain boundary with an increase in crystallographic misorientation, which, in turn, reduces the flow of supercurrent across the grain boundary. D. Dimos, P. Chaudhari, J. Mannhart, and F. K. LeGoues, in "Orientation Dependent of Grain Boundary Critical Currents in $YBa_2Cu_3O_{7-x}$ Bicrystals, "Pyys. Rev. Lett., Vol. 61, No. 2, pg. 219, 1988.

It is also known that there exists an anisotropy in superconduction for high-$T_c$ oxides, with the greatest supercurrent flowing in directions lying in the crystallographic a-b planes of the superconducting oxide grains. (See FIG. 5) Thus, it is desirable to obtain bodies with superconducting oxide grains oriented such that a preferred direction of supercurrent is aligned with the operationally-required direction of current flow, and such that the degree of crystallographic misorientation between neighboring oxide grains is minimized.

Figure 5:
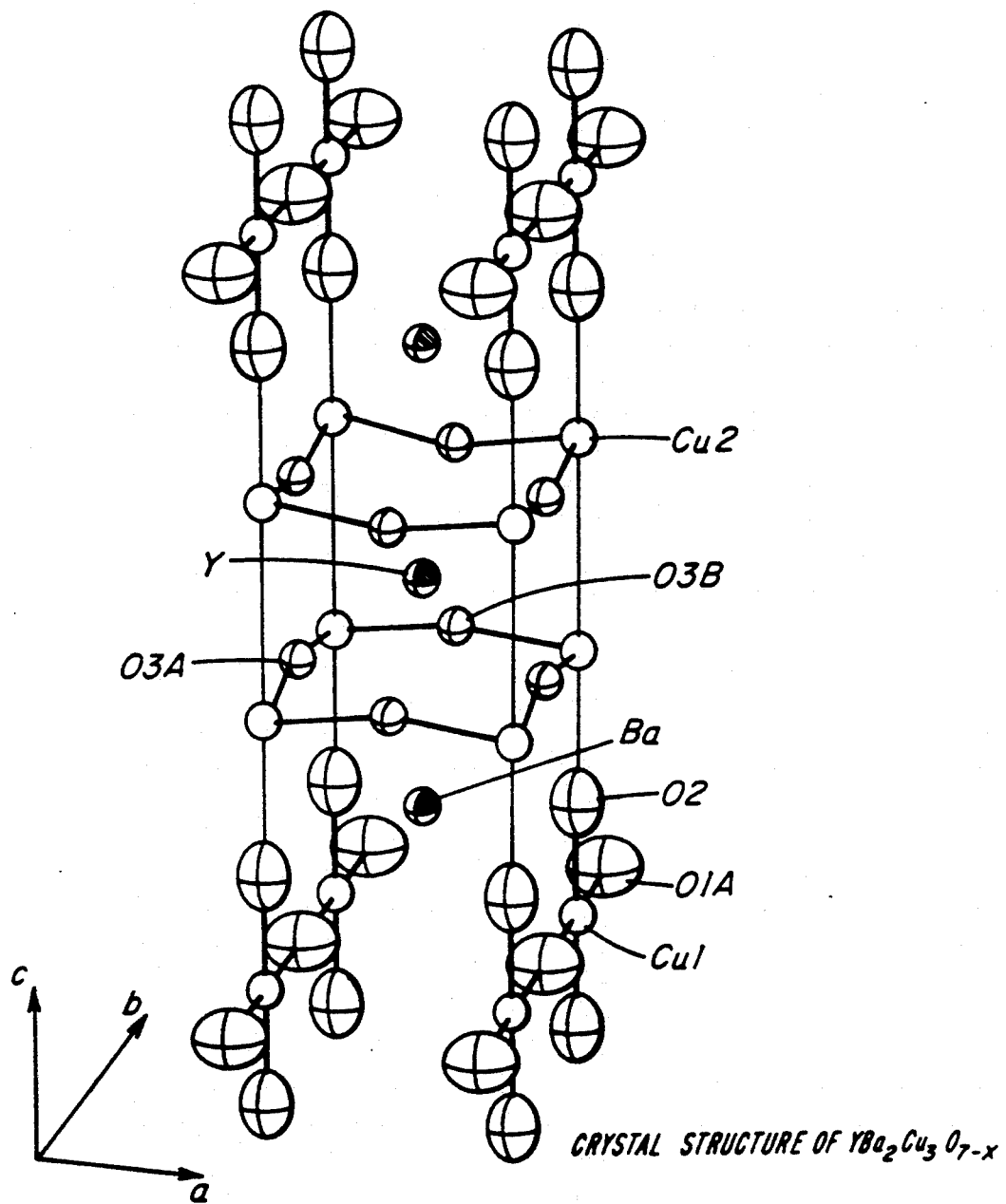
FIG. 5 is a diagram of the crystal lattice of a superconducting oxide.

It is further known that a crystallographic growth rate anisotropy exists in high-$T_c$ oxide supeconductors, such that the superconducting oxide grains grow to become relatively long in directions parallel to the a-b plane of the unit cell and relatively short in the c direction. (FIG. 5). (Thus, the long dimension of the unit cell becomes the short dimension of the oxide grain.) The growth of the superconducting grain is most rapid in directions parallel to the a-b plane, but not in the c direction.

If the growth of the high-$T_c$ superconducting oxide grains during heat treatment is constrained in one or two dimensions and unconstrained in the other dimension(s), then the longest grains to form are those oriented with the fast-growth crystallographic directions (directions parallel to the a-b planes in high-$T_c$ oxides) parallel to the unconstrained dimension(s). As discussed above, it is desirable to obtain high-$T_c$ oxide superconducting bodies having the fast-growing a-b planes of the grains aligned parallel to the direction of bulk current flow. It is also known that during annealing and normal grain growth, large grains tend to consume smaller grains in order to minimize the total free energy associated with the grain boundaries. M. Hillert, Acta Met., Vol. 13, pg. 227, 1965. The grains that are oriented with a-b planes parallel to an unconstrained dimension can grow to become relatively long and will eventually consume smaller grains that are not so oriented. The latter grains are limited in length by the thin dimension(s). Thus, it is possible to obtain a preferred grain alignment by constraining the anisotropic growth of high-$T_c$ oxide grains.

Figure 6:
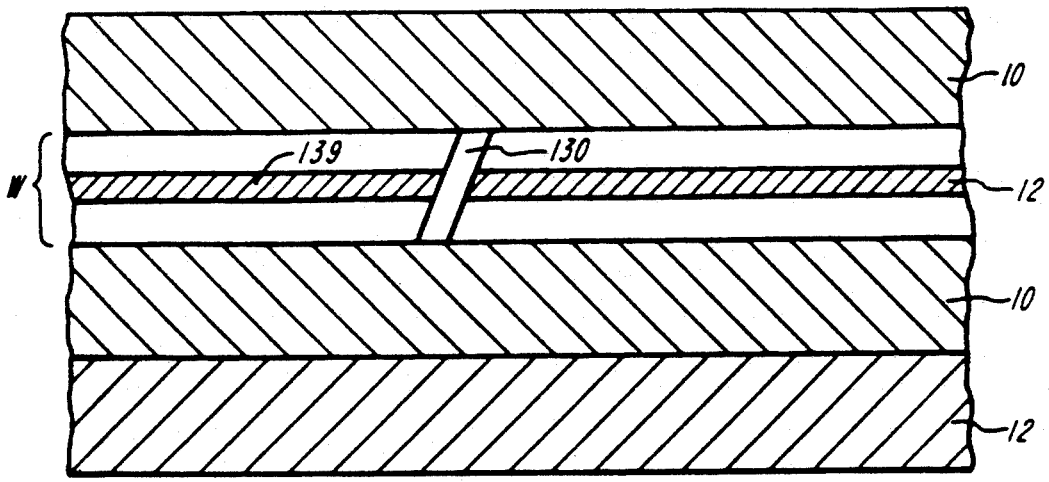
FIG. 6 is a cross sectional view of several layers of laminate structure illustrating the growth of crystals.
Figure 3:
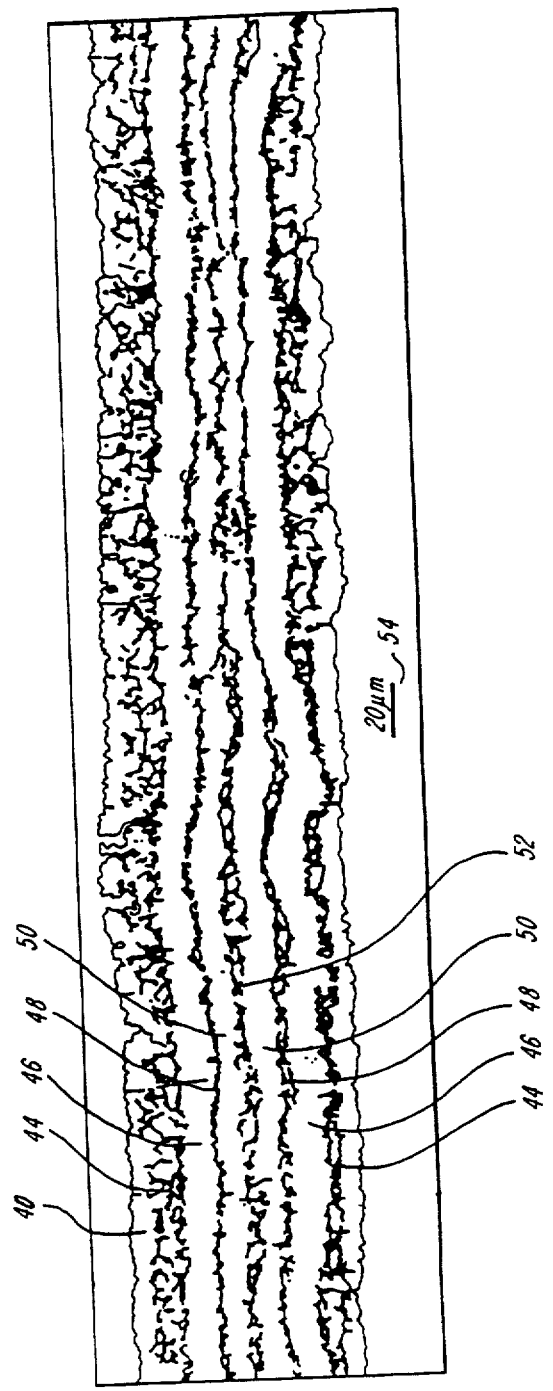

The process described herein for producing a laminate composed of layers containing a large concentration of high-$T_c$ superconducting oxide and layers containing a large concentration of either a metal or other ceramic phase can yield the preferred alignment of the superconducting oxide grains by providing a constraint on the growth of the superconducting grains in one or more dimensions. More specifically, referring to FIG. 6, a crystal grain 130, whose a-b plane is oriented along the width (w) of an oxide layer 12, will grow rapidly until encountering the surrounding non-oxide layers 10. However, a crystal grain 138 whose a-b plane is oriented parallel to the oxide layer 12, encounters no boundaries, and accordingly grows extremely large. Since larger grains 138 can consume smaller grains such as 130, the aggregate crystal aligns itself in the direction of the larger grains. Accordingly, by limiting the size of crystals 130, the surrounding layers 10 effectively force the crystal to grow in the desired direction.

Other embodiments are within the scope of the following claims.

What is claimed is:

1. A method of preparing a laminated ceramic comprising the steps of:
   a. preparing a metal alloy precursor comprising at least one noble metal element component and at least two non-noble metal elements,
   b. exposing said precursor to a first environment to form a first oxidized zone having a first concentration of primary ceramic phases containing said non-noble metal elements, and
   c. exposing said precursor to a second environment to form a second oxidized zone having a second concentration of said primary ceramic phases containing said non-noble metal elements, said second concentration being different from said first concentration,
   said exposing steps being such that neither of said steps oxidizes said noble metal element.

2. A method of preparing a laminated ceramic comprising the steps of:
   a. preparing a metal alloy precursor comprising at least one noble metal element component and at least two non-noble metal elements,
   b. exposing said precursor to a first environment to form an oxidized zone having a first concentration of primary ceramic phases containing said at least two non-noble metal elements,
   c. exposing said precursor to a second environment to form an oxidized zone having a second concentration of said primary ceramic phases containing said at least two non-noble metal elements, said second concentration being different from said first concentration, and
   d. repeating steps b and c at least once to form a plurality of zones with a said first concentration of ceramic phases of said non-noble metal elements separated by layers of a said second concentration of ceramic phases of said non-noble metal elements.

3. The method of claim 2 further comprising the step of
   d. exposing said layered precursor to a third environment to convert said primary ceramic phases of said non-noble metal elements into a primary multi-component ceramic.

4. A method of preparing a laminated ceramic comprising the steps of:
   a. preparing a metal alloy precursor comprising at least one noble metal element component and at least two non-noble metal elements,
   b. exposing said precursor to a first environment to form an oxidized zone having a first concentration of primary ceramic phases containing said at least two non-noble metal elements,
   c. exposing said precursor to a second environment to form an oxidized zone having a second concentration of said primary ceramic phases containing said at least two non-noble metal elements, said second concentration being different from said first concentration,
   d. exposing said layered precursor to a third environment to convert said primary ceramic phases of said non-noble metal elements into a primary multi-component ceramic,
   said noble metal element being oxidized during exposure to said third environment to form a secondary ceramic phase.

5. A method of preparing a laminated ceramic comprising the steps of:
   a. preparing a metal alloy precursor comprising at least one noble metal element component and at least two non-noble metal elements,
   b. exposing said precursor to a first environment to form an oxidized zone having a first concentration of primary ceramic phases containing said non-noble metal elements,
   c. exposing said precursor to a second environment to form an oxidized zone having a second concentration of said primary ceramic phases containing said non-noble metal elements, said second concentration being different from said first concentration, and
   d. exposing said layered precursor to a third environment to oxidize said noble metal element to form a secondary ceramic phase.

6. The method of claim 2 wherein said environments comprise an oxidizing agent comprising at least one element from the group O, N, C, S, P, F, Cl, Br, and I.

7. The method of claim 1 including the step of applying an electrical potential to said precursor.

8. The method of claim 2 wherein said precursor comprises a layer of a material that is permeable to an oxidizing agent, said layer being external of said elements.

9. The method of claim 8 wherein the said external layer is a metal.

10. The method of claim 1 wherein said first environment induces a first outward diffusion to each of said non-noble metal elements and a first inward diffusion of oxygen, and wherein said second environment induces a second outward diffusion of at least one of said non-noble metal elements and a second inward diffusion of oxygen, wherein, for at least one no-noble metal element, the ratio of said first outward diffusion to said first inward diffusion is greater than the ratio of said second outward diffusion to said second inward diffusion.

11. The method of claim 2 wherein said noble metal elements comprises at least one element from the group comprising Ag, Au, Pt, Pd, Rh, Ir, Os, Hg and Cu.

12. The method of claim 3 wherein said primary multi-component ceramic is a superconductor.

13. The method of claim 12 wherein said non noble metal alloy precursor elements comprise Y, Ba, Cu, and wherein said noble metal alloy precursor element comprises Ag, and wherein the ratios Y:Ba:Cu:Ag are approximately 1:2:3:X, where X>0.

14. The method of claim 13 wherein said second concentration is less than said first concentration and step c comprises heating said precursor at approximately 200°-930° C. in a substantially pure $O_2$ atmosphere.

15. The method of claim 13 wherein said second concentration is less than said first concentration and step b comprises heating said precursor at approximately 200°-960° C. in a reducing atmosphere.

16. The method of claim 13 wherein said second concentration is less than said first concentration and step b comprises heating said precursor at approximately 200°-960° C. in a reducing atmosphere.

17. The method of claim 13 wherein said second concentration is less than said first concentration and step b comprises heating said precursor at approximately 200°-960° C. in an atmosphere comprising an inert gas and a reducing gas.

18. The method of claim 12 wherein said non-noble metal alloy elements comprise Y, Ba and wherein said noble metal alloy precursor element comprises Cu.

19. The method of claim 18 wherein said noble metal alloy precursor element further comprises Ag.

20. A method of preparing a laminated ceramic comprising the steps of:
    a. preparing a metal alloy precursor comprising at least one noble metal element component and at least two non-noble metal elements,
    b. heating said precursor at approximately 200 deg. C in an atmosphere having an oxygen partial pressure less than approximately $10^{-30}$ atmospheres to form an oxidized zone having a first concentration of primary ceramic phases containing said non-noble metal elements,
    c. exposing said precursor to a second environment to form an oxidized zone having a second concentration of said primary ceramic phases containing said non-noble metal elements, said second concentration being less than said first concentration,
    d. exposing said layered precursor to a third environment to convert said primary ceramic phases of said non-noble metal elements into a superconductor, said non-noble metal elements comprising Ya and B, and said noble metal element comprising Cu.

21. A method of preparing a laminated ceramic comprising the steps of:
    a. preparing a metal alloy precursor comprising at least one noble metal element component and at least two non-noble metal elements,
    b. exposing said precursor to a first environment to form an oxidized zone having a first concentration of primary ceramic phases containing said non-noble metal elements,
    c. heating said precursor at approximately 780° C. in an atmosphere having an oxygen partial pressure less than approximately $10^{-9}$ atmospheres to form an oxidized zone having a second concentration of said primary ceramic phases containing said non-noble metal elements, said second concentration being less than said first concentration,
    d. exposing said layered precursor to a third environment to convert said primary ceramic phases of said non-noble metal elements into a superconductor, said non-noble metal elements comprising Ya and B, and said noble metal element comprising Cu.

22. A method of preparing a laminated ceramic comprising the steps of:
    a. preparing a metal alloy precursor comprising at least one noble metal element component and at least two non-noble metal element,
    b. heating said precursor at approximately 200°-780° C. in an atmosphere including one or both of an inert gas and a reducing gas to form an oxidized zone having a first concentration of said primary ceramic phases containing said non-noble metal elements,
    c. exposing said precursor to a second environment to form an oxidized zone having a second concentration of primary ceramic phases containing said non-noble metal elements, said second concentration being less than said first concentration,
    d. exposing said layered precursor to a third environment to convert said primary ceramic phases of said non-noble metal elements into a superconductor, said non-noble metal elements comprising Ya and B, and said noble metal element comprising Cu.

23. The method of claim 22 wherein said atmosphere is a reducing atmosphere.

24. The method of claim 22 wherein said atmosphere comprises an inert gas and a reducing gas.

25. The method of claim 22 wherein said atmosphere is an inert atmosphere.

26. A method of preparing a laminated ceramic comprising the steps of:
    a. preparing a metal alloy precursor comprising at least one noble metal element component and at least two non-noble metal elements,
    b. exposing said precursor to a first environment to form an oxidized zone having a first concentration of primary ceramic phases containing said non-noble metal elements, and
    c. exposing said precursor to a second environment to form an oxidized zone having a second concentration of said primary ceramic phases containing said non-noble metal elements, said second concentration being less than said first concentration, and
    d. exposing said precursor including said oxidized zones to a third environment to transform said primary ceramic phases into a complex metal oxide that includes all of said at least two non-noble metal elements.

* * * * *

UNITED STATES PATENT AND TRADEMARK OFFICE
CERTIFICATE OF CORRECTION

PATENT NO. : 5,259,885

DATED : November 9, 1993

INVENTOR(S) : Kenneth H. Sandhage

It is certified that error appears in the above-indentified patent and that said Letters Patent is hereby corrected as shown below:

Delete Drawing Sheet 2 and substitute therefor the Drawing Sheet consisting of FIG. 3, as shown on the attached page.

Column 2, line 53, "an" should be --a--.

Column 2, line 57, insert --ceramic-- before "with".

Column 6, line 54, "$g = [D_O/D_L]^{1/2} N_O/2nN_L$" should be --$g = p^{1/2}[D_O/D_L]^{1/2} N_O/2nN_L$--.

Column 7, line 8, "rfc" should be --erfc--.

Remove text from column 11, line 11, beginning with "cross-sectional", through column 11, line 45, ending with "bands", and insert same at column 10, line 46, before "with".

Column 12, line 55, "Cuy" should be --$Cu_y$--.

Column 13, line 49, "02" should be --$O_2$--.

Column 14, line 59, "$La_{1-x}CoO_3$;" should be --$La_{1-x}Sr_xCoO_3$;--.

Column 15, line 10, after "two", "of" should be --or--.

Column 15, line 16, after "$Zn^{+2}$", insert --$Mg^{+2}$--.

Column 15, line 59, "$B_2{}_0O_3$" should be --$B_2O_3$--.

UNITED STATES PATENT AND TRADEMARK OFFICE
CERTIFICATE OF CORRECTION

PATENT NO. : 5,259,885
DATED : November 9, 1993
INVENTOR(S) : Kenneth H. Sandhage It is certified that error appears in the above-indentified patent and that said Letters Patent is hereby corrected as shown below:

Column 16, line 47, "Pyys." should be --Phys.--.

Column 16, line 48, after "." insert --"--.

Column 17, line 14, after "Met", insert --.--

Claim 10, Column 19, line 4, "to" should be --of--.

Claim 10, Column 19, line 10, "no-noble" should be --non-noble--.

Claim 11, Column 19, line 16, "comprises" should be --comprise--.

Claim 15, Column 19, line 32, "a reducing" should be --an inert--.

Claim 22, Column 20, line 28, "element," should be --elements,--.

Signed and Sealed this

Sixteenth Day of May, 1995

Attest:

BRUCE LEHMAN

Attesting Officer    Commissioner of Patents and Trademarks